(No Model.) 2 Sheets—Sheet 1.

B. J. CURRY.
PORTABLE HAY PRESS.

No. 333,059. Patented Dec. 22, 1885.

Attest
F. H. Schott
Fred E. Tasker

Inventor:
Burwell J. Curry.
Per John C. Tasker atty (No Model.) 2 Sheets—Sheet 2.
B. J. CURRY.
PORTABLE HAY PRESS.
No. 333,059. Patented Dec. 22, 1885.
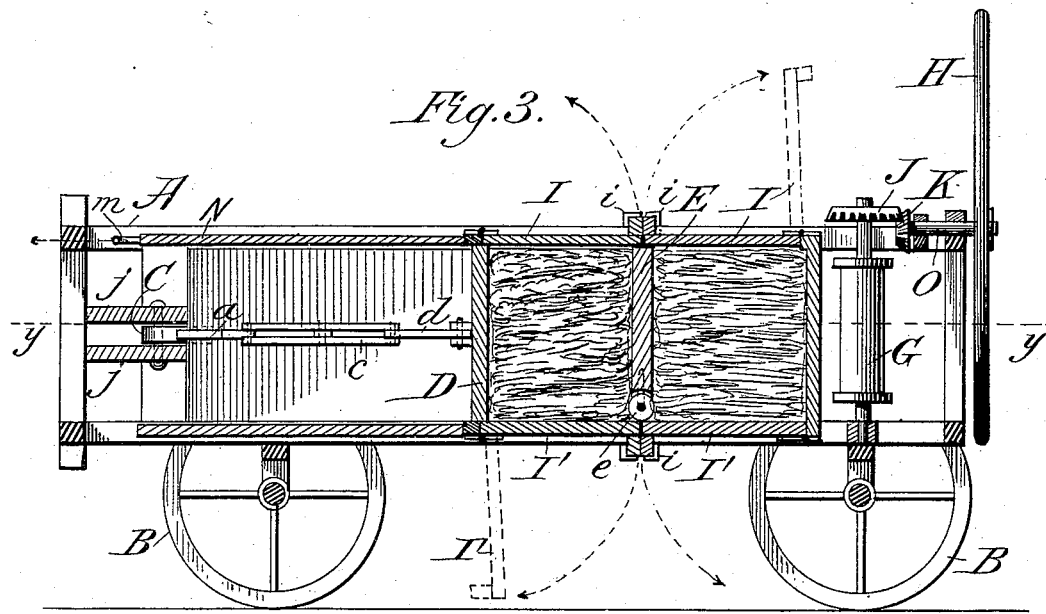
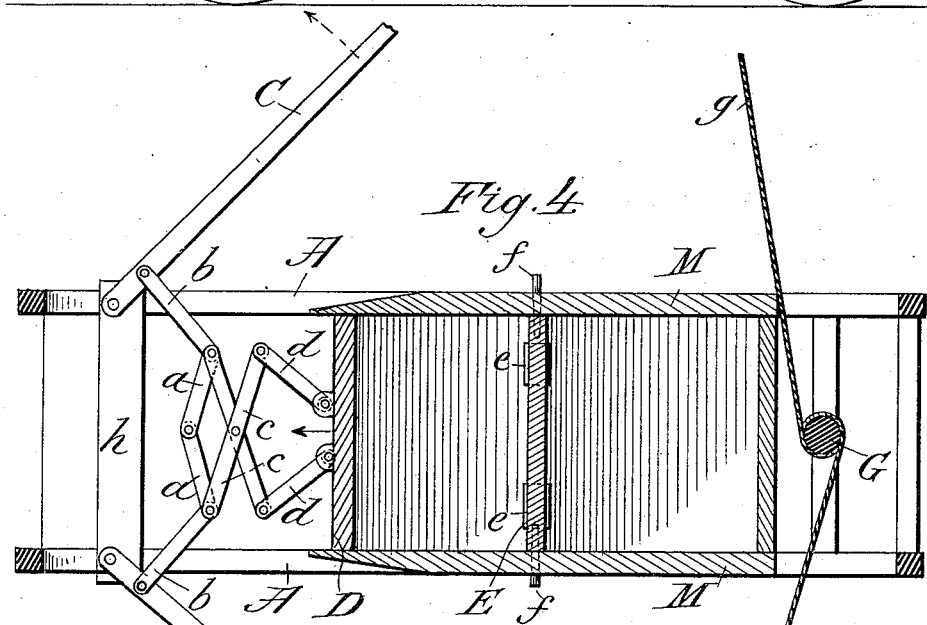
Attest:
F. H. Schott
Fred E. Tasker
Inventor:
Burwell J. Curry
per John C. Pashwatty

UNITED STATES PATENT OFFICE.

BURWELL J. CURRY, OF HUNTSVILLE, ALABAMA.

PORTABLE HAY-PRESS.

SPECIFICATION forming part of Letters Patent No. 333,059, dated December 22, 1885.

Application filed August 26, 1885. Serial No. 175,354. (No model.)

*To all whom it may concern:*

Be it known that I, BURWELL J. CURRY, a citizen of the United States, residing at Huntsville, in the county of Madison and State of Alabama, have invented certain new and useful Improvements in Portable Hay-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in portable hay-presses, such as are intended to be used to press the hay into bales before it is removed from the fields; and it consists in the construction and arrangement of parts, as hereinafter more fully described and claimed.

Figure 1:
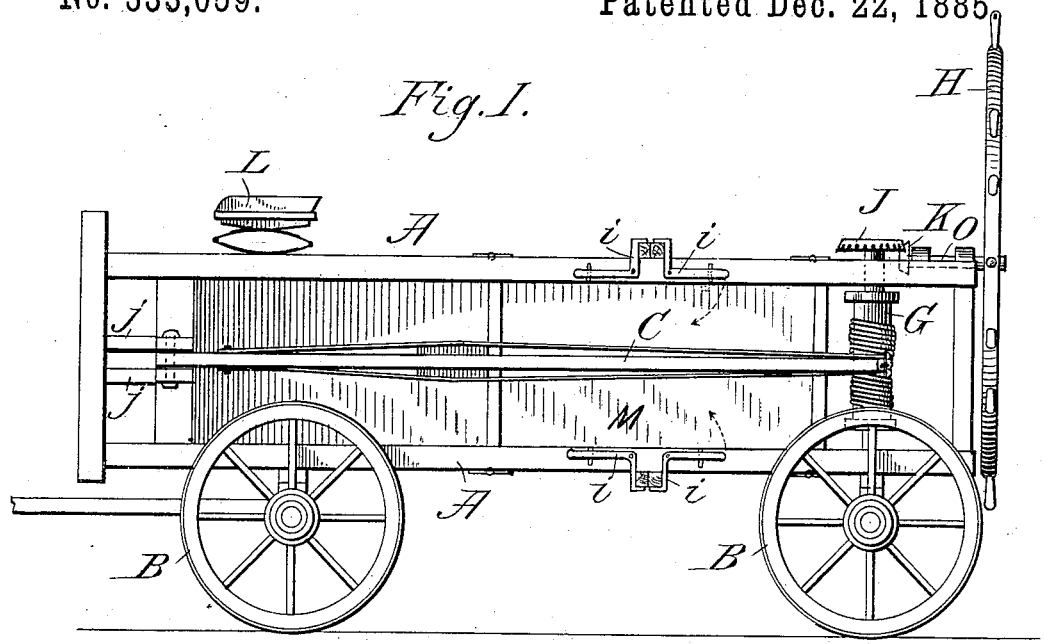
Figure 2:
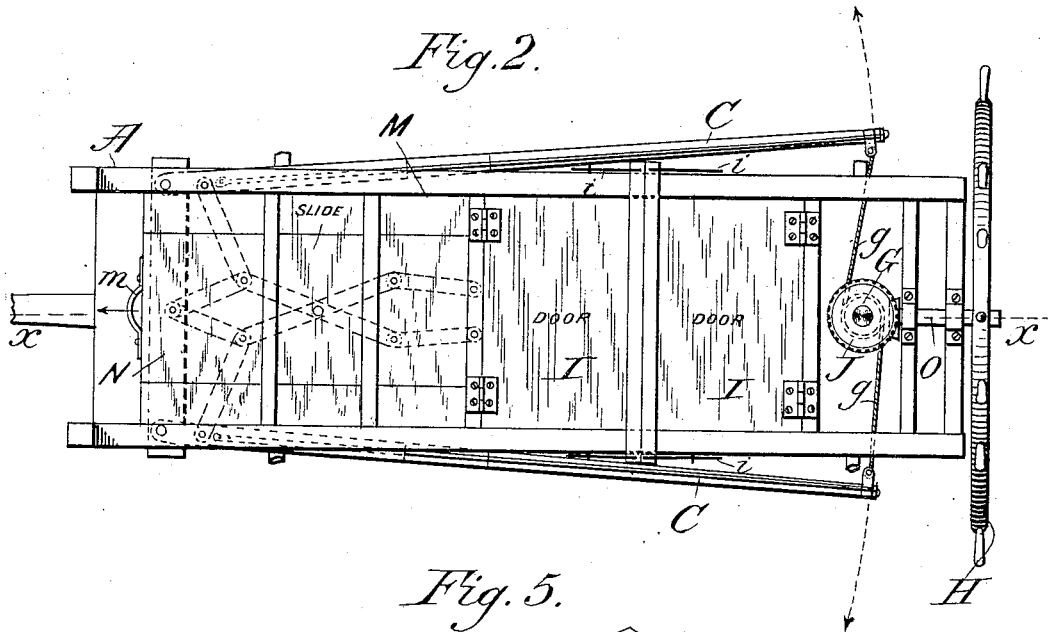
Figure 5:
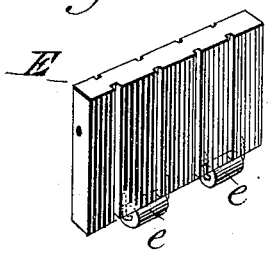

In the annexed drawings, illustrating my invention, Figure 1 is a side elevation of my improved portable hay-press. Fig. 2 is a top view of the same. Fig. 3 is a vertical section on the line $x\ x$ of Fig. 2. Fig. 4 is a horizontal section on the line $y\ y$ of Fig. 3; and Fig. 5 is a perspective of one of the platens.

Like letters designate like parts in the several views.

A represents any suitably-constructed framework or carriage, consisting of bars, cross-beams, &c., provided with wheels B, having mounted thereon a seat, L, and adapted to receive the various parts of the mechanism used in pressing the hay. Within this framework is situated a press-box, M, provided preferably with two or more hinged doors or covers, I I, and one sliding door, N, as shown in Fig. 2. Thus the top of the box may be almost entirely removed by the opening of all the covers, so that hay may be readily placed therein to be pressed. A portion of the bottom of the box may also be opened by means of the covers I' I', hinged on the under side of the same, in order to allow the completed bales of hay to be discharged on the ground. The arrow lines in Fig. 3 designate the direction of motion of these several covers when being opened. The forward end of the press-box M is preferably left unclosed, in order to allow of the arrangement of a system of leverage whose function it is to drive or press a platen or follower against the hay contained in the box, and so compress the same into bales. Directly in front of this unclosed end of the press-box two parallel horizontal cross-beams, $j$, are located, which are connected at their ends with the frame-work A, and so supported. These cross-beams are situated far enough apart to allow the levers C C to be pivoted between them, one at each end, as shown in Figs. 4 and 3. These levers are of a length equal to or greater than the length of the box, on either side of which they are placed, as seen in Fig. 2, and they may be closed, as when they are drawn close to the box, as shown in the same figure, or open, as when extended at an angle, as shown in Fig. 4.

Pivoted to each lever C, near its own pivotal end, is a short lever, $b$. These two levers connect with each other by means of two additional short levers, $a\ a$, which are united by means of a pivot. Connected also with the ends of levers $b\ b$ are two cross-levers, $c\ c$, which are pivoted to each other at their middle point, and to the ends of these levers are connected still other levers, $d\ d$, which are pivoted in any convenient manner to a platen or follower, D, moving within the press-box. Thus a sort of lazy-tongs is formed, which may be longer or shorter, as desired, and composed of a more or less number of levers; but I preferably employ the combination just described, as being one justified by the best results in action and greater convenience in construction. When the long lever-arms C are closed, the system of levers will have extended themselves to their utmost limit, and have thrust the platen D to that position within the press-box where it will exert the greatest pressure upon the hay. On the other hand, when the long lever-arms are open, the leverage will be contracted together, and the platen D be at its opposite limit or close to the end of the press-box M. These levers C are to be opened by hand, inasmuch as there will be no appreciable resistance to such an operation, and consequently no necessity for providing a special apparatus for the purpose; but in order to close the levers when a great quantity of hay is in the press-box, and when consequently much resistance is offered to the forward motion of the platen D, a special apparatus is provided. This apparatus consists of a cylindrical drum, G, mounted vertically within the frame-work at the rear of the carriage, and provided on its upper end with a beveled gear, J. Also, a horizontal shaft, O, is journaled in the rear of the frame back of the drum G. This shaft carries at one end a beveled gear, K, which meshes with the gear J, and at the other end a large pilot-wheel, H, by means of which the shaft O is rotated. Around the drum G are wound two ropes, g g, which connect, respectively, with the levers C C on each side of the machine. It is evident now that when the hand-wheel H is rotated the revolution of the drum G will draw the two levers inward toward each other. This movement will drive the platen D against the hay and compress it into bales in the manner already alluded to.

It is often desirable to compress the contents of the press-box into two bales rather than into one by means of a single manipulation of the apparatus. To this end a second follower, E, is provided, and is placed in the press-box in the position shown in Fig. 3. The form of this platen is represented in Fig. 5. Its lower edge is provided with two or more rollers, which enable the follower to slide easily along on the floor of the press-box, its vertical position being secured and maintained by the pressure of the hay on either side.

In operating this machine for the purpose of forming two bales at a single compression the levers C C are first thrown open, then the second or loose partition or follower E is inserted into the press-box at a point near the middle of its length, and the small pins $ff$ are passed through small holes in the sides of the box and into the follower in order to hold it in an upright position temporarily while the hay is being put into the press. This position of the follower is shown in Fig. 4. The upper doors, I I, and the slide N being open, the press-box is filled completely with hay. The doors are now closed tightly and clamped in position by clamps $i\ i$. Then the hand-wheel H is rotated, which causes the drum G to revolve and wind the ropes $g\ g$ upon it. Thus the arms C C will be closed, and the system of levers in the forward end of the press-box, which is actuated by said levers C C, will drive the platen D against the hay and compress the same. The compression of the hay will cause the second follower, E, to move upon its rollers until the hay on its other side is compressed—i. e., the follower E being situated in the middle of the quantity of hay within the press-box will, when the hay is compressed in the manner described, so adjust itself with respect to the hay as to allow two bales of nearly equal size to be formed. These bales will be easily discharged from the press by opening the doors I' I'.

It is evident that the operation of the press in compressing one bale of hay will be similar in all respects to that just described in the case of two bales, except that the use of the follower E will be dispensed with.

Having thus described my invention, what I claim as new and desire to secure by Letters Patent, is—

1. A portable hay-press consisting of the frame A, wheels B, press-box M, having slide N, upper doors, I I, and lower doors, I' I', and the platen D, actuated by a system of leverage which consists of lever-arms C C, levers $b\ b$, intermediate levers, $a\ a$, cross-levers $c\ c$, and levers $d\ d$, substantially as shown and described.

2. In a portable hay-press, the follower E, having rollers $e\ e$, substantially as described.

3. In a portable hay-press, the press-box M, open at one end, having slide N, with handle $m$, upper doors, I I, lower doors, I' I', secured by clamps, and said box being provided with a platen, D, and a removable follower, E, provided with apertures and pins $f$, whereby the same may be held temporarily in a vertical position, substantially as shown and described.

4. In a portable hay-press, the combination, with a press-box constructed substantially as described, of a removable follower, E, provided with rollers $e\ e$, and pins $ff$ for its temporary adjustment in a vertical position, substantially as shown and described.

In testimony whereof I affix my signature in presence of two witnesses.

BURWELL J. CURRY.

Witnesses:
E. F. WALKER,
J. W. COOPER, Jr.